United States Patent
Bathija (10) Patent No.: US 8,793,334 B1
(45) Date of Patent: Jul. 29, 2014

(54) NETWORK-ATTACHED STORAGE (NAS) BANDWIDTH MANAGER

(75) Inventor: Pravin M. Bathija, San Jose, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 381 days.

(21) Appl. No.: 12/839,225

(22) Filed: Jul. 19, 2010

(51) Int. Cl.
*G06F 15/16* (2006.01)
*G06F 12/00* (2006.01)
*G06F 17/30* (2006.01)

(52) U.S. Cl.
USPC ........... 709/217; 709/219; 707/821; 707/822; 707/827

(58) Field of Classification Search
USPC ................... 709/217, 219; 707/821, 822, 827
See application file for complete search history.

(56) References Cited

U.S. PATENT DOCUMENTS

| | | | | |
|---|---|---|---|---|
| 6,466,978 B1* | 10/2002 | Mukherjee et al. | ........... | 709/225 |
| 2004/0044770 A1* | 3/2004 | Messick et al. | ............... | 709/226 |
| 2004/0122938 A1* | 6/2004 | Messick et al. | ............... | 709/224 |
| 2004/0181589 A1* | 9/2004 | Suleiman | ...................... | 709/213 |
| 2006/0095656 A1* | 5/2006 | Ueoka et al. | .................. | 711/111 |
| 2007/0106774 A1* | 5/2007 | Yokota et al. | ................. | 709/223 |

* cited by examiner

*Primary Examiner* — Shirley Zhang
(74) *Attorney, Agent, or Firm* — Amin, Turocy & Watson, LLP (57) ABSTRACT

A system and process are provided for managing bandwidth in a network-attached storage (NAS) system. The process provides a NAS storage device having a network interface, at least one storage drive, a controller head, and a NAS bandwidth manager application enabled as software instructions. The process receives a request for access to a file system share from a client via a network having a maximum throughput rate. The NAS bandwidth manager identifies the client and provides client access to the NAS at an allocated bandwidth. In one aspect, the NAS bandwidth manager consults a preconfigured bandwidth allocation chart in response to the client request. In another aspect, the NAS bandwidth manager may receive a request for a particular bandwidth from the client.

20 Claims, 12 Drawing Sheets

NETWORK-ATTACHED STORAGE (NAS) BANDWIDTH MANAGER

BACKGROUND OF THE INVENTION

1. Field of the Invention

This invention generally relates to digital data storage and, more particularly to bandwidth division management system providing Quality of Service (QoS) to clients accessing a file system share on a network-attached storage subsystem.

2. Description of the Related Art

Network-attached storage (NAS) is file level computer data storage connected to a computer network to provide data access to heterogeneous mix of network clients. A NAS unit is a computer connected to a network that only provides file-based data storage services to other devices on the network. Although it may technically be possible to run other software on a NAS unit, it is not designed to be a general purpose server. For example, NAS units usually do not have a keyboard or display, and are controlled and configured over the network, often using a browser. A fully-featured operating system is not needed on a NAS device, so often a stripped-down operating system is used. For example, FreeNAS, an open source NAS solution designed for commodity PC hardware, is implemented as a stripped-down version of FreeBSD.

NAS systems contain one or more hard disks, often arranged into logical, redundant storage containers or RAID arrays (redundant arrays of inexpensive/independent disks). NAS removes the responsibility of file serving from other servers on the network. NAS uses file-based protocols such as NFS (popular on UNIX systems), SMB/CIFS (Server Message Block/Common Internet File System) (used with MS Windows systems), or AFP (used with Apple Macintosh computers). NAS units rarely limit clients to a single protocol.

NAS provides both storage and a file system. This system is often contrasted with SAN (Storage Area Network), which provides only block-based storage and leaves file system concerns on the "client" side. SAN protocols are SCSI, Fibre Channel, iSCSI, ATA over Ethernet (AoE), or HyperSCSI. The key difference between direct attached storage (DAS) and NAS is that DAS is simply an extension to an existing server and is not networked, while NAS sits on a network as its own entity; it is easier to share files with NAS.

Performance can be increased using a NAS because the file serving is done by a dedicated (NAS) server, not a server responsible for performing other processing tasks. The performance of NAS devices depends heavily on the speed of and traffic on the network and on the amount of cache memory on the NAS computers or devices.

Figure 1:
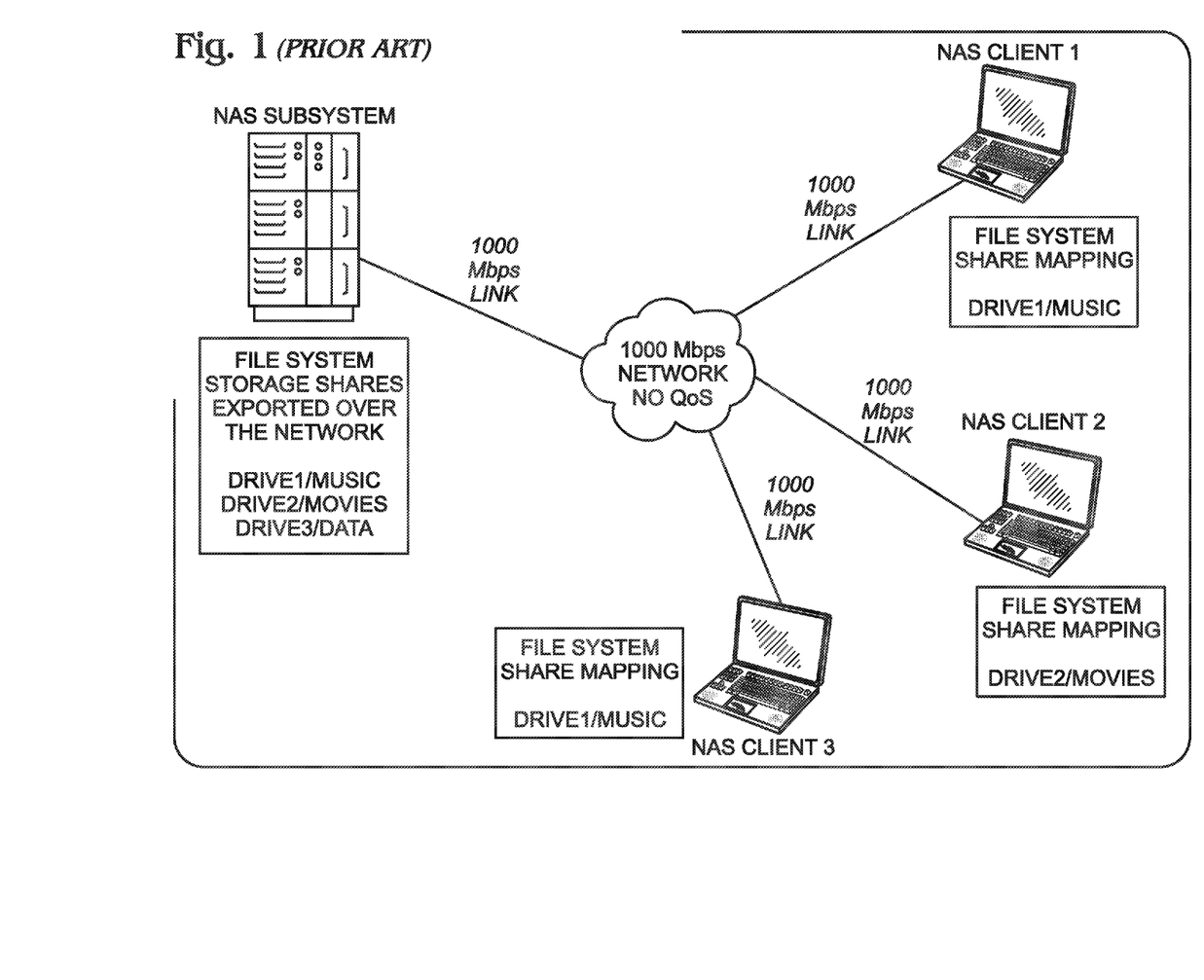
FIG. 1 is a schematic block diagram depicting a network with multiple CIFS clients requesting a file system share (prior art).

FIG. 1 is a schematic block diagram depicting a network with multiple CIFS clients requesting a file system share (prior art). A NAS subsystem or a Common Internet File System (CIFS) server subsystem exports a storage file system over a networked infrastructure. This storage can be accessed by multiple CIFS clients who can perform read/write access to the shared media. A CIFS server is a software module that runs on a NAS subsystem and exports file system shares to be accessed by CIFS clients over a TCP/IP Network. A CIFS client is a software module that runs on any computer system and accesses a file system share over a TCP/IP network from a CIFS server running on a NAS subsystem. TCP/IP (Transmission Control Protocol/Internet Protocol) is the most widely used protocol for data networking.

Presently there exists no bandwidth management/QoS enforced on the NAS subsystem/CIFS server side. As shown in the figure, when a CIFS client requests a file system mapping share from a NAS subsystem/CIFS Server, it is allocated without any bandwidth management/QoS considerations. If the number of clients accessing the shared storage over the network is small, the clients may very well experience good throughput. As the number of clients accessing the NAS subsystem increases, the throughput per client reduces due to the limited bandwidth available on the NAS subsystem. These low throughput characteristics might be sufficient for some clients, whereas other clients may require a certain level of guaranteed bandwidth due to the data intensive nature of the applications running on their client systems.

Figure 2:
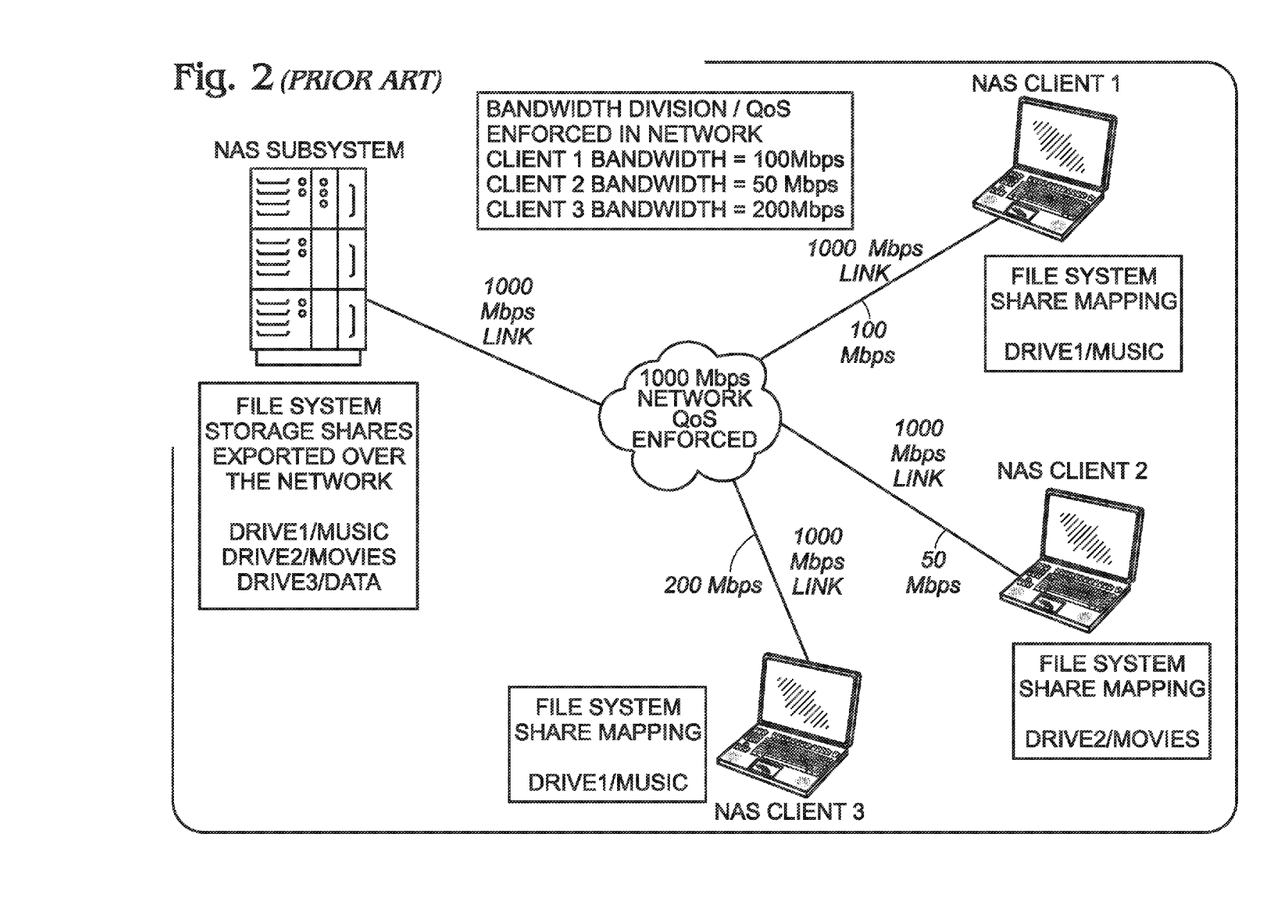
FIG. 2 is a schematic block diagram of a NAS system where bandwidth management/QoS is performed at the network level (prior art).

FIG. 2 is a schematic block diagram of a NAS system where bandwidth management/QoS is performed at the network level (prior art). A QoS capable switch is configured to limit the bandwidth of data flow between the NAS subsystem and a NAS client. The addition of a switch, and associated software, to perform QoS/bandwidth management is costly. Further, QoS-aware networking equipment is not always efficient, as the switch is not necessarily aware of NAS capabilities and client needs.

It would be advantageous if a NAS subsystem was aware of how much throughput it could deliver over a particular network, and make bandwidth allocation decisions based on this information.

It would be advantageous if bandwidth allocation could be performed by file system share mapping and the use of client identity.

SUMMARY OF THE INVENTION

Described herein is a Network-Attached Storage (NAS) bandwidth manager capable of exporting one or more file system shares, which can be simultaneously accessed by different clients. Conventionally, this is done without allocating a bandwidth/throughput/performance guarantee for the client accessing the file system. This results in unpredictable file system performance from the client standpoint. The NAS bandwidth manager allocates the available bandwidth among clients as requested, thus providing predictable file system performance/throughput to the client requesting access to the networked file system.

Accordingly, a process is provided for managing bandwidth in a NAS system. The process provides a NAS storage device having a network interface, at least one storage drive, a controller head, and a NAS bandwidth manager application enabled as software instructions. The process receives a request for access to a file system share from a client via a network having a maximum throughput rate. The NAS bandwidth manager identifies the client and provides client access to the NAS at an allocated bandwidth.

In one aspect, the NAS bandwidth manager consults a preconfigured bandwidth allocation chart in response to the client request. The bandwidth allocation chart cross-references bandwidth allocation to client identity. For example, the NAS bandwidth manager may compare the network maximum throughput rate to already allocated bandwidth, to determine available bandwidth. Then, the client is allocated the bandwidth cross-referenced to the client in the chart, if the cross-referenced bandwidth is less than the available bandwidth. If the cross-referenced bandwidth is greater than the available bandwidth, the client is allocated a portion of the bandwidth cross-referenced to the first client. Otherwise, the client is allocated no bandwidth if there is no available bandwidth.

In another aspect, the NAS bandwidth manager may receive a request for a first bandwidth from the client. The NAS bandwidth manager compares the network maximum throughput rate to already allocated bandwidth, to determine available bandwidth, and allocates the first bandwidth on a per client basis in response to determining the available bandwidth. In a different aspect, the NAS bandwidth manager may receive a bandwidth management by share request for a plurality of bandwidths corresponding to a plurality of client network ports. In this case, the NAS bandwidth manager allocates the plurality of bandwidths to the corresponding client network ports in response to determining the available bandwidth.

Additional details of the above-described process, and a NAS bandwidth management system, are provided below.

DETAILED DESCRIPTION

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The NAS storage device and client computer devices described below typically employ a computer system with a bus or other communication mechanism for communicating information, and a processor coupled to the bus for processing information. The computer system may also includes a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with position calculation. Alternately, these functions, or some of these functions may be performed in hardware. The practical implementation of a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 3:
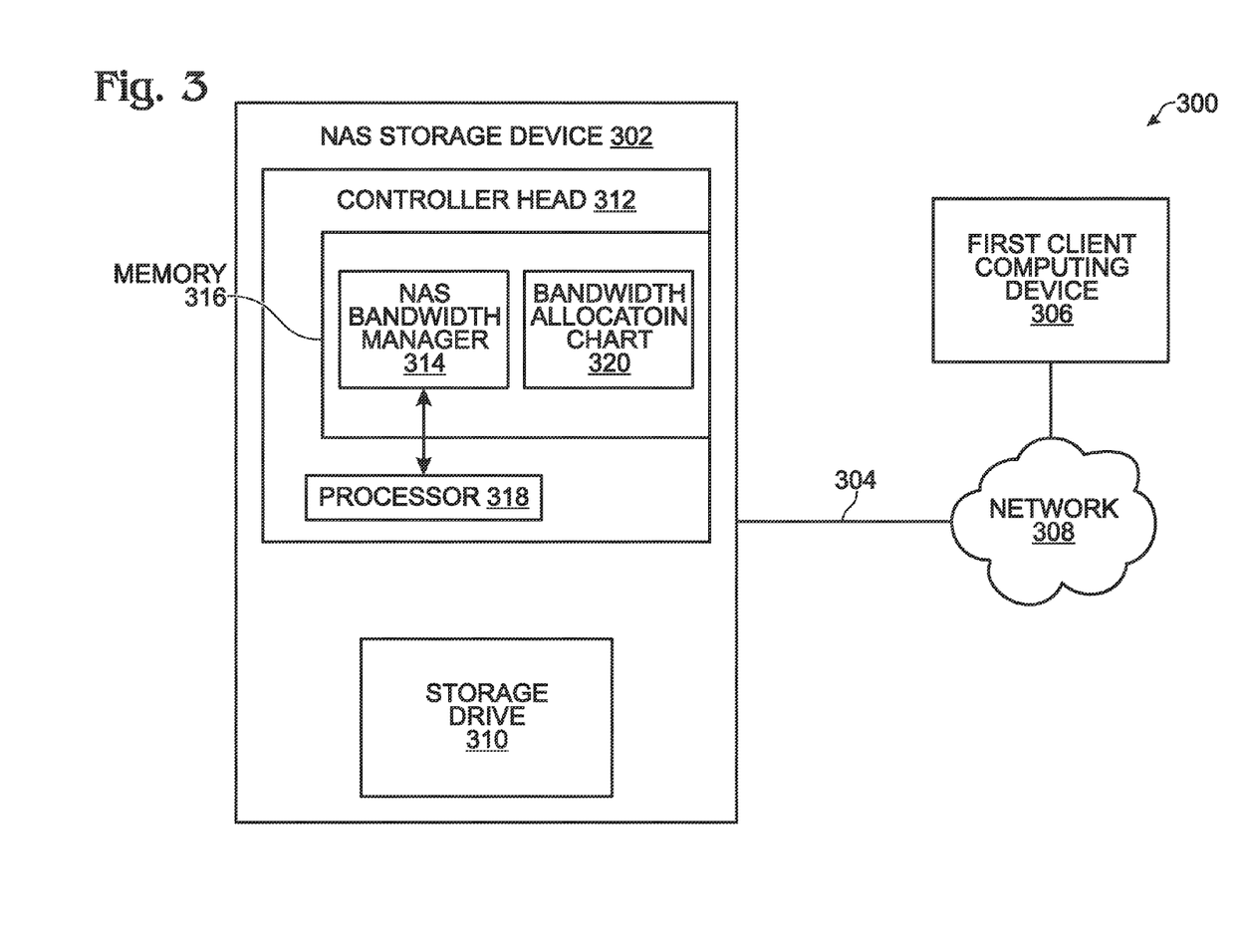
FIG. 3 is a schematic block diagram of a network-attached storage (NAS) bandwidth management system.

FIG. 3 is a schematic block diagram of a network-attached storage (NAS) bandwidth management system. The system 300 comprises a NAS storage device 302 including a network interface on line 304 connected to a first client computing device 306 via a network 308 having a maximum throughput rate. Note: although only a single client is shown, the system is not limited to any particular number of clients. The NAS storage device 302 includes at least one storage drive 310, although a typical NAS storage device may comprise several storage drives. The NAS storage device 302 also includes a controller head 312 with a NAS bandwidth manager application 314 enabled as a sequence of software instructions stored in memory 316 and executed by a processor 318.

The NAS bandwidth manager 314 receives a request for access to a file system share from the first client computing device 306, identifies the first client computing device, and provides first client computing device access to the NAS at an allocated bandwidth.

In one aspect, the controller head 312 includes a preconfigured bandwidth allocation chart 320 cross-referencing bandwidth allocation to client identity. The NAS bandwidth manager 314 consults the bandwidth allocation chart 320 in response to the first client computing device request, and allocates the bandwidth cross-referenced to the first client computing device 306. More explicitly, the NAS bandwidth manager 314 may compare the network maximum throughput rate to already allocated bandwidth to determine available bandwidth, and allocate bandwidth as follows. If the cross-referenced bandwidth is less than the available bandwidth, the first client computing device 306 is allocated the bandwidth cross-referenced to the first client in the chart 320. If the cross-referenced bandwidth is greater than the available bandwidth, the first client computing device 306 is allocated a portion of the bandwidth cross-referenced in the chart 320. If there is no available bandwidth, the first client computing device is allocated no bandwidth. The NAS bandwidth manager 314 may also fail to provide the first client computing device access to the NAS if the first client computing device does not have a preconfigured bandwidth allocation in the chart 320.

Using a residual bandwidth algorithm, the NAS bandwidth manager 314 may establish a primary bandwidth reserve and a secondary bandwidth reserve. The NAS bandwidth manager 314 determines available bandwidth, and if the available primary bandwidth is greater than, or equal to the first bandwidth, it allocates the first bandwidth to the first client in response to either a client bandwidth request or from a preconfigured bandwidth allocation in the chart 320. If the available primary bandwidth is less than the first bandwidth, it allocates the available primary bandwidth plus a portion of the reserve bandwidth to the first client. In this aspect, clients receive the requested or chart preconfigured bandwidth until the primary bandwidth reserve is used up. Clients requesting a file system share after the primary bandwidth reserve is used up are allocated at least a portion of the secondary bandwidth reserve, regardless of how many clients are making similar requests.

Figure 4:
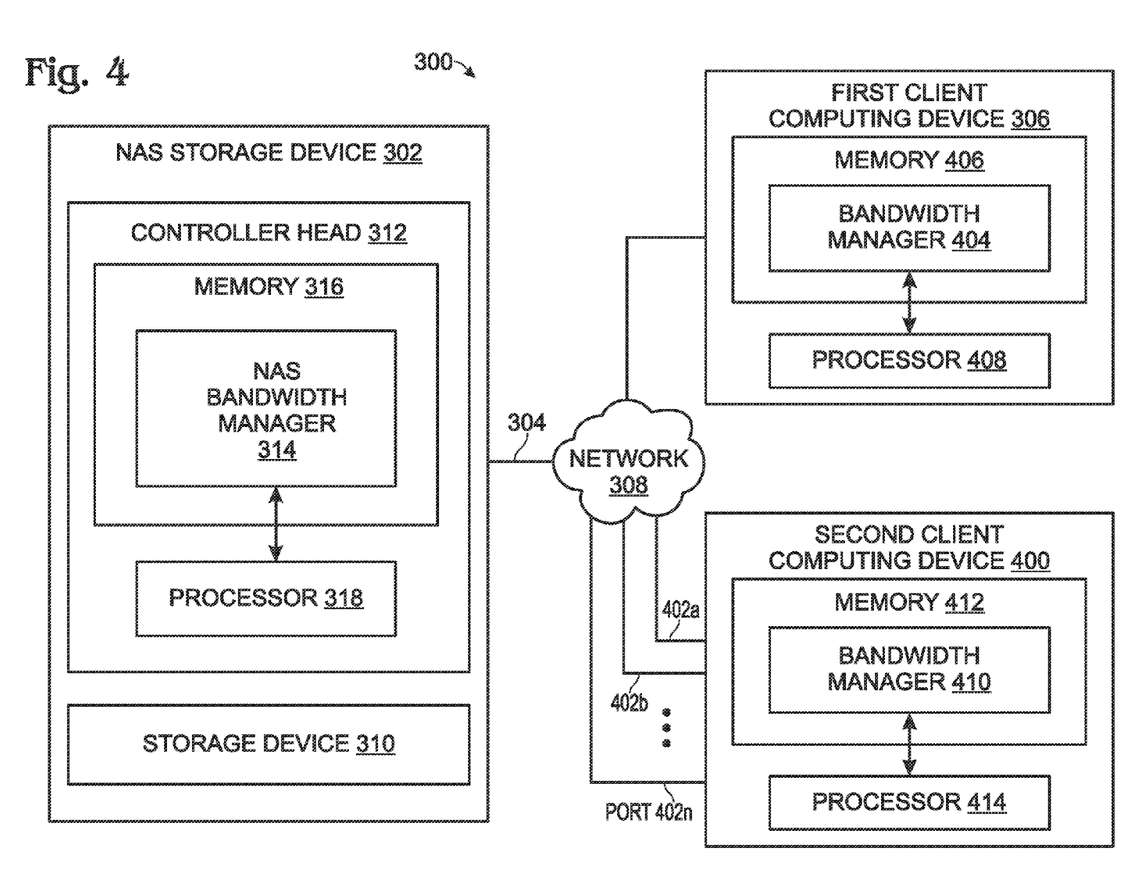
FIG. 4 is a schematic block diagram depicting a variation of the NAS bandwidth management system of FIG. 3.

FIG. 4 is a schematic block diagram depicting a variation of the NAS bandwidth management system of FIG. 3. In this aspect the NAS bandwidth manager 314 receives a request for a first bandwidth from the first client computing device 306, compares the network maximum throughput rate to already allocated bandwidth to determine available bandwidth, and allocates the first bandwidth on a per client basis in response to determining the available bandwidth. That is, the first client computing device 306 allocates bandwidth on basis of the client request, as well as consideration of available bandwidth. In other words, the bandwidth is managed in responsive to client ID. The request received from each client comes from a unique client IP address so it is possible for the NAS bandwidth manager to differentiate between requests from various clients.

In one aspect, the NAS bandwidth manager 314 receives a bandwidth management by share request from a second client computing device 400, for a plurality of bandwidths corresponding to a plurality of second client computing device network ports 402. Shown are ports 402a through 402n, where n is a variable not limited to any particular integer value. The NAS bandwidth manager 314 allocates the plurality of bandwidths to the corresponding network ports 402a-402n in response to determining the available bandwidth.

In bandwidth management by "client ID" (FIG. 3), the software on the NAS subsystem can't differentiate between two different connection requests originating from the same client—since they have the same source IP address/TCP port combination. In "bandwidth management by share", the software on the NAS subsystem is able to differentiate between two different connections originating from the same client, since clients supporting "bandwidth management by share" use a different TCP port for each connection. Conventional NAS client software uses the same TCP port for all connections originating from a client.

For example, Client A makes a connection to a NAS subsystem and requests access to folder "music" with a bandwidth of 20 Mbps. Then, it requests another connection and requests access to folder "documents" with a bandwidth of 50 Mbps. This feature is not possible in a conventional NAS subsystem using conventional NAS client software, since all connections on the client originate from the same TCP port number. Thus, there is no way for the NAS subsystem software to differentiate one request from the other for the allocating of bandwidth. Bandwidth management by share overcomes this issue by defining the requirement for a NAS client that it use different TCP port numbers for each connection. Intelligent software is also required on the NAS subsystem side to recognize this behavior, allocate bandwidth, and maintain state information about individual client connections.

In another aspect, the first client computing device 306 includes a first client bandwidth manager application 404 enabled as a sequence of software instructions stored in memory 406 and executed by a processor 408. The first client bandwidth manager 404 sends the request to access the NAS storage device at the first bandwidth. The NAS bandwidth manager 314 allocates the first bandwidth to the first client computing device 306, if the first bandwidth is less than the available bandwidth. A portion of the first bandwidth is allocated to the first client computing device 306, if the first bandwidth is greater than the available bandwidth. No bandwidth is allocated to the first client computing device 306 if there is no available bandwidth. In one aspect, the NAS bandwidth manager 314 may fail to provide the first client computing device access to the NAS if the first client computing device fails to request an explicit bandwidth value.

Likewise, the second client computing device 400 may include a second client bandwidth manager application 410 enabled as a sequence of software instructions stored in memory 412 and executed by a processor 414. The second client bandwidth manager 410 sends the request to access the NAS storage device. More explicitly, the second client bandwidth manager 410 determines that it is able to access the NAS via a plurality of network ports 402a-402n, and sends a bandwidth management by share request to access the NAS at a plurality of bandwidths corresponding to the plurality of network ports. The allocation of bandwidth to the particular ports is based upon the amount of available bandwidth, as described above with respect to the first computing device's request for the first bandwidth.

Functional Description

Figure 5:
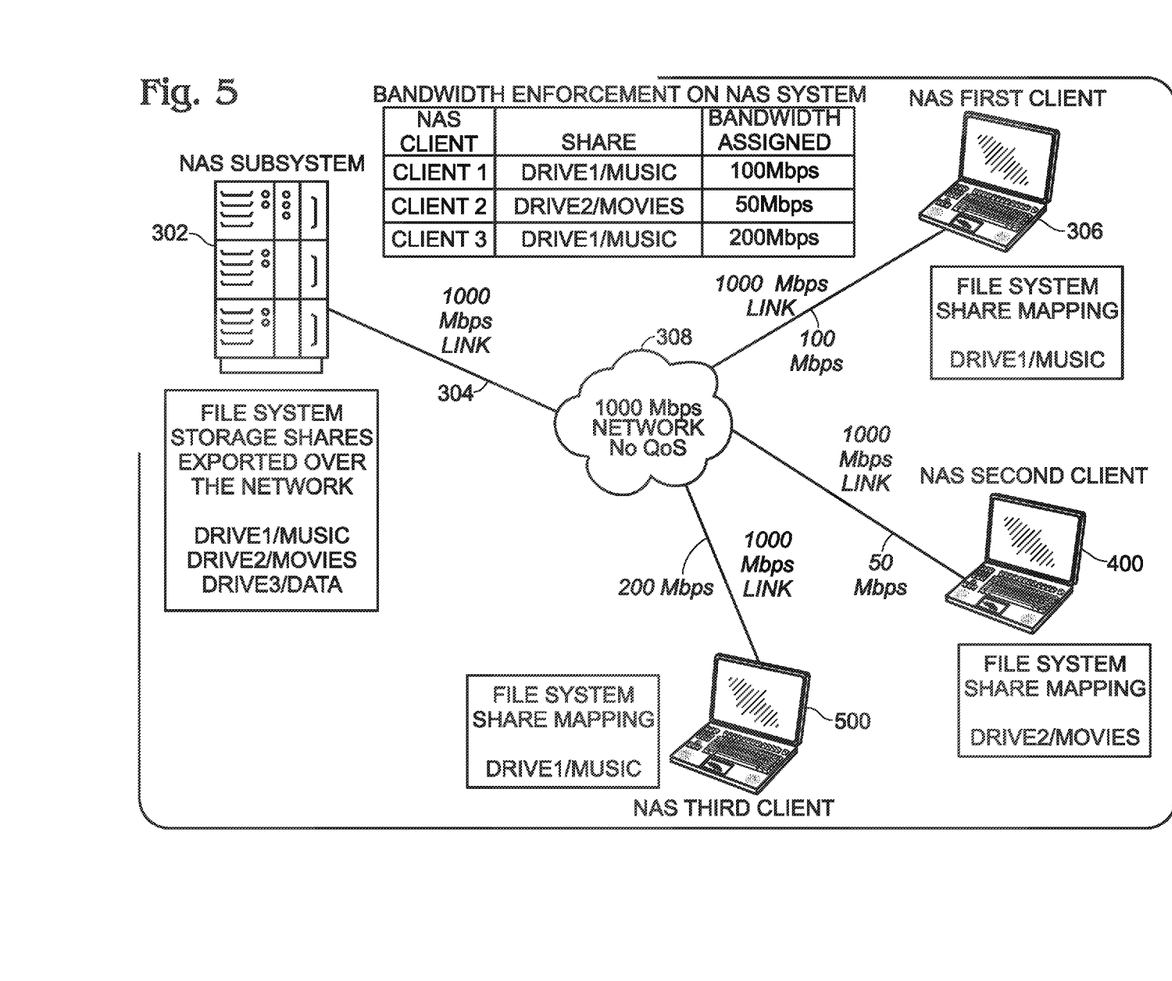
FIG. 5 is a schematic block diagram depicting the systems of FIG. 3 or 4 in operation.

FIG. 5 is a schematic block diagram depicting the systems of FIG. 3 or 4 in operation. A bandwidth management/QoS function is enforced on the NAS subsystem, but the function is not provided by a network 308 switch. Multiple clients accessing file system shares from the NAS subsystem are allocated the requested bandwidth by the NAS subsystem/CIFS server 302. The NAS storage device 302 divides the available bandwidth between multiple clients as per request, and limits the throughput of that connection between each client and the subsystem.

As noted above, there are two ways in which the system can be implemented, either as bandwidth management using rate negotiation between CIFS client and CIFS server (NAS subsystem), or as bandwidth management by configuring bandwidth for specific clients. The first method, associated with FIG. 4, requires software support for a NAS bandwidth manager on both CIFS client and server. The second method, associated with FIG. 3, requires software support for NAS bandwidth manager only on CIFS server side.

In the rate-negotiation method of NAS bandwidth management, the NAS client requests a certain amount of bandwidth as part of the mapping process. There are two ways in which bandwidth management may be performed when using the rate negotiation method. First, bandwidth management is performed per share mapping/connection. Here, every file system share mapping from a client is allocated a certain amount of bandwidth by the NAS subsystem. Second, bandwidth management is performed per client (identity). Here, every client is allocated a certain amount of bandwidth by the NAS subsystem regardless of the number of file system share mappings from the client to the NAS subsystem.

Figure 6:
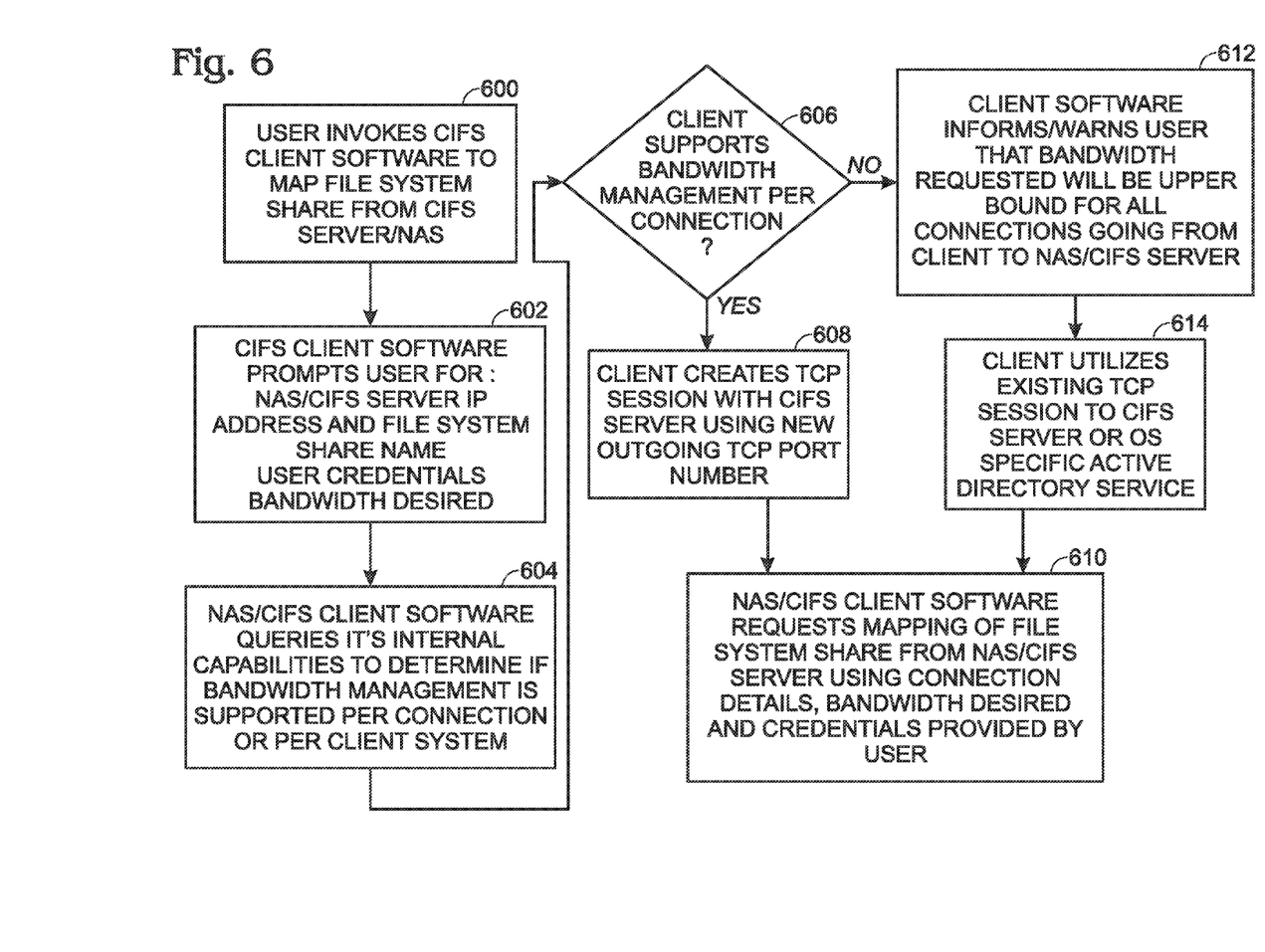
FIG. 6 is a flowchart illustrating the sequence of client-side events occurring with the use of rate negotiation bandwidth management.

FIG. 6 is a flowchart illustrating the sequence of client-side events occurring with the use of rate negotiation bandwidth management. In Step 600 the user invokes a CIFS/NAS client to map a file system share from the remote NAS subsystem. In Step 602 the client software prompts the user to enter connection details like NAS subsystem IP address, file system share name, user credentials, and bandwidth desired (e.g., in megabytes per second (MBps)). In Step 604 the client software then queries its internal capabilities to determine if bandwidth management is supported per connection or per client identity. If bandwidth management is supported per connection/share (Step 606), then every file system share mapping from the client to the NAS/CIFS subsystem can be allocated its own portion of bandwidth on the NAS/CIFS subsystem (Step 608 and 610). If, on the other hand, bandwidth management is only supported by client identity, then the bandwidth on the NAS subsystem is allocated per client system (Step 612, 614, and 610). The total amount of bandwidth for all mappings from a client to the NAS/CIFS subsystem is limited by this allocated amount.

For example, when performing bandwidth management by connection/share, the client can request a bandwidth of 20 MBps for "File System share 1" and 30 MBps for "File System share 2", assuming 50 MBps (20 MBps+30 MBps) of bandwidth is available for allocation on the NAS/CIFS subsystem. When performing bandwidth management by client identity, if the client requests 40 MBps for a connection and this amount is available on the CIFS/NAS subsystem, the sum total of bandwidth/throughput of all connections or shares from the client to CIFS/NAS subsystem never exceeds 40 MBps.

The differences between bandwidth management by share and client identity stem from the way the client software is implemented. Several implementations of the client software use the same TCP port to connect from the client to the NS/CIFS subsystem for all connections/File System mappings. From the NAS/CIFS subsystem software implementation standpoint, the NAS bandwidth manager performs bandwidth division by a combination of Client IP address and TCP port. If the all connections/mappings from the client to NAS/CIFS subsystem come from the same TCP port, they are limited to the bandwidth allocated for that IP address. In other words, it is not possible for the NAS bandwidth manager to differentiate between individual connections/shares coming from the client to NAS/subsystem since they are all sent over the same IP address and TCP port combination.

If, on the other hand, the client uses a different TCP port for each connection/share to the NAS/CIFS subsystem, the NAS/CIFS subsystem is able to assign bandwidth to each connection individually as each individual connection is differentiated by the client TCP port with which it is associated.

Figure 7:
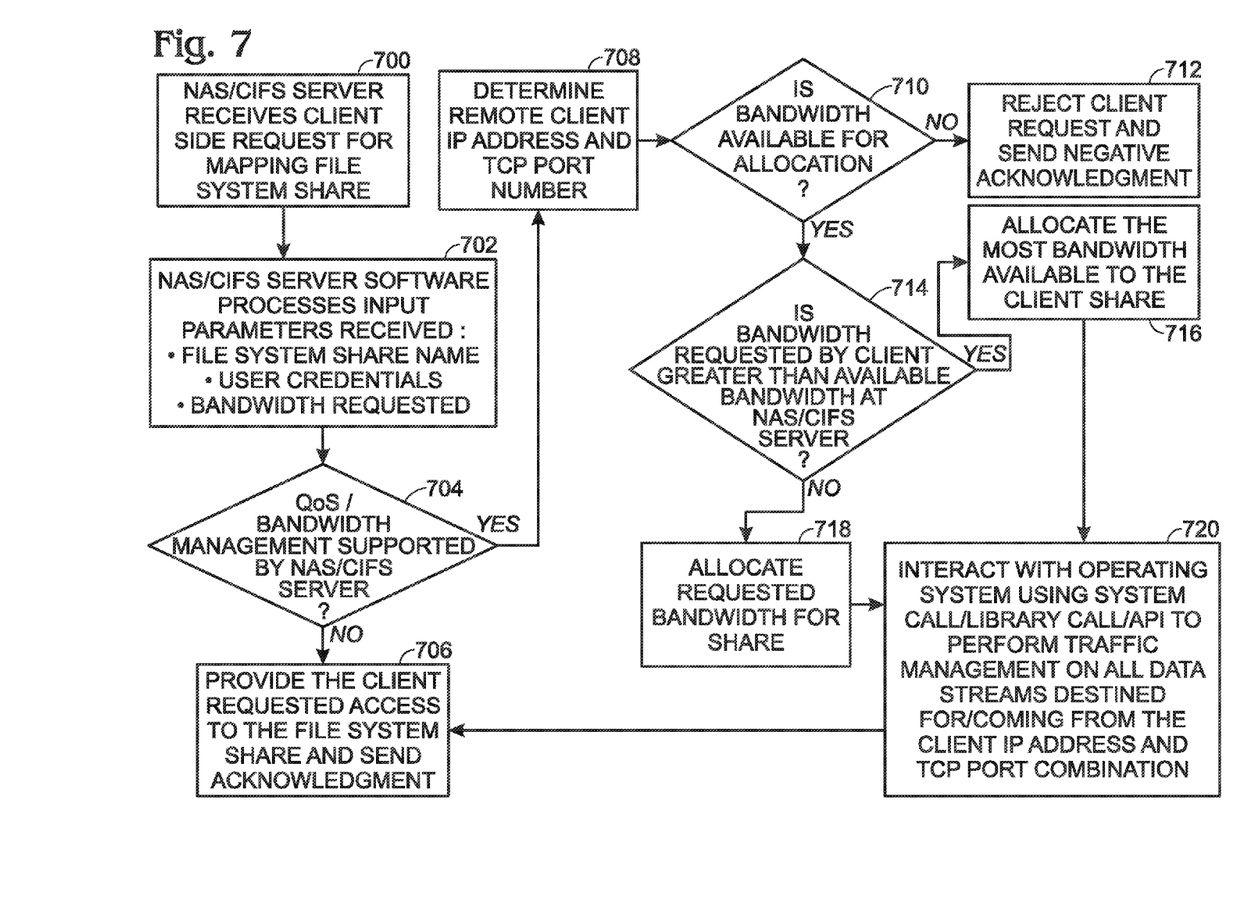
FIG. 7 is a flowchart illustrating steps performed by the NAS storage device in the rate negotiation bandwidth management method.

FIG. 7 is a flowchart illustrating steps performed by the NAS storage device in the rate negotiation bandwidth management method. The CIFS server side module is important in implementing the bandwidth management feature. After the CIFS/NAS server receives a mapping request from the client in Step 700, Step 702 verifies the file system share name, user credentials, and amount of bandwidth requested. If bandwidth management is not supported by the CIFS/NAS server (Step 704), it maps the requested file system share and returns a positive acknowledgement to the client in Step 706. If bandwidth management is supported on the NAS subsystem, the NAS bandwidth manager module determines the IP address and the TCP port number of the requesting client connection in Step 708. The bandwidth manager maintains state information of the bandwidth allocated to various clients and file system shares mapped. If no more (zero) bandwidth is available for allocation to any client requesting access to a file system share (Step 710), the NAS subsystem rejects the client mapping request and sends back a negative acknowledgement to the client in Step 712.

An alternative implementation (not shown) would be that the NAS system always has some residual bandwidth available from which it can meet file system share mapping requests without providing any bandwidth/performance guarantees. For example, the bandwidth manager may allocate 40% each, to two different clients requesting file system mappings. Here, it guarantees that each client receives 40% of the available bandwidth. If an additional client requests bandwidth, the share would be mapped for the client. However, the bandwidth for the mapping would range from 0 to 20% without any guarantee for a specific amount.

For example, assume a NAS storage subsystem has 100 Mbytes of total physical bandwidth available. If the NAS Bandwidth manager implements the residual bandwidth algorithm, it may allocate 80 MBps of bandwidth (primary reserve) to clients that request bandwidth on a first-come-first-serve basis. It reserves 20 MBps for residual allocation (secondary reserve). All the clients that request bandwidth for the first 80 MBps are guaranteed a bandwidth. For instance, if client A requests 25 MBps, client B requests 40 MBps, and client C requests 15 MBps, the NAS bandwidth manager meets the bandwidth guarantees for clients A, B, and C. For clients that request bandwidth after the 80 MBps are allocated, there are no guarantees. This means that they are granted access to the requested NAS file system share, but the bandwidth allocated to them is capped by the 20 MBps residual (secondary reserve). Depending on the traffic patterns, the clients receiving allocation out of the residual bandwidth may or may not have their bandwidth requirements met, but receive at least some access to the file system share, instead of being rejected outright.

For instance, client D requests 30 MBps, but this bandwidth is not allocated since there is only 20 MBps available for residual allocation. The NAS bandwidth manager limits the traffic to/from client D to 20 MBps without allocating any minimum. The same algorithm applies to clients E, F, G that may request bandwidth after client D.

If a client requests bandwidth that is less than the residual available, the bandwidth is limited to the requested amount, without any guarantees for a minimum bandwidth. For example, if Client H requests 10 MBps, the NAS bandwidth manager limits the traffic to/from client H to 10 MBps without allocating any minimum. The advantage of this method is that all clients requesting access to the NAS, get access. At the same time, clients that request bandwidth first, receive the desired guaranteed bandwidth.

The bandwidth allocation table for the above example is as follows:
Client A: 25 MBps guaranteed
Client B: 40 MBps guaranteed
Client C: 15 MBps guaranteed
Client D: 0 to 20 MBps
Client E: 0 to 20 MBps
Client F: 0 to 20 MBps
Client G: 0 to 20 MBps
Client H: 0 to 10 MBps.

Returning to FIG. 7, if bandwidth requested by the client is greater than what is actually available at the NAS subsystem (Step 714), the most available bandwidth is allocated to the client and a positive acknowledgement is sent back in Step 716. Once the total amount of available bandwidth is allocated on the NAS subsystem, requests for any more bandwidth are rejected. If the bandwidth requested by the client is less than available bandwidth, the requested amount is allocated and a positive acknowledgement is sent back to the client in Step 718. In Step 720 the NAS bandwidth allocator uses system calls, interface/library calls, or APIs that interact with the kernel space software to allocate bandwidth per client connection.

Figure 8:
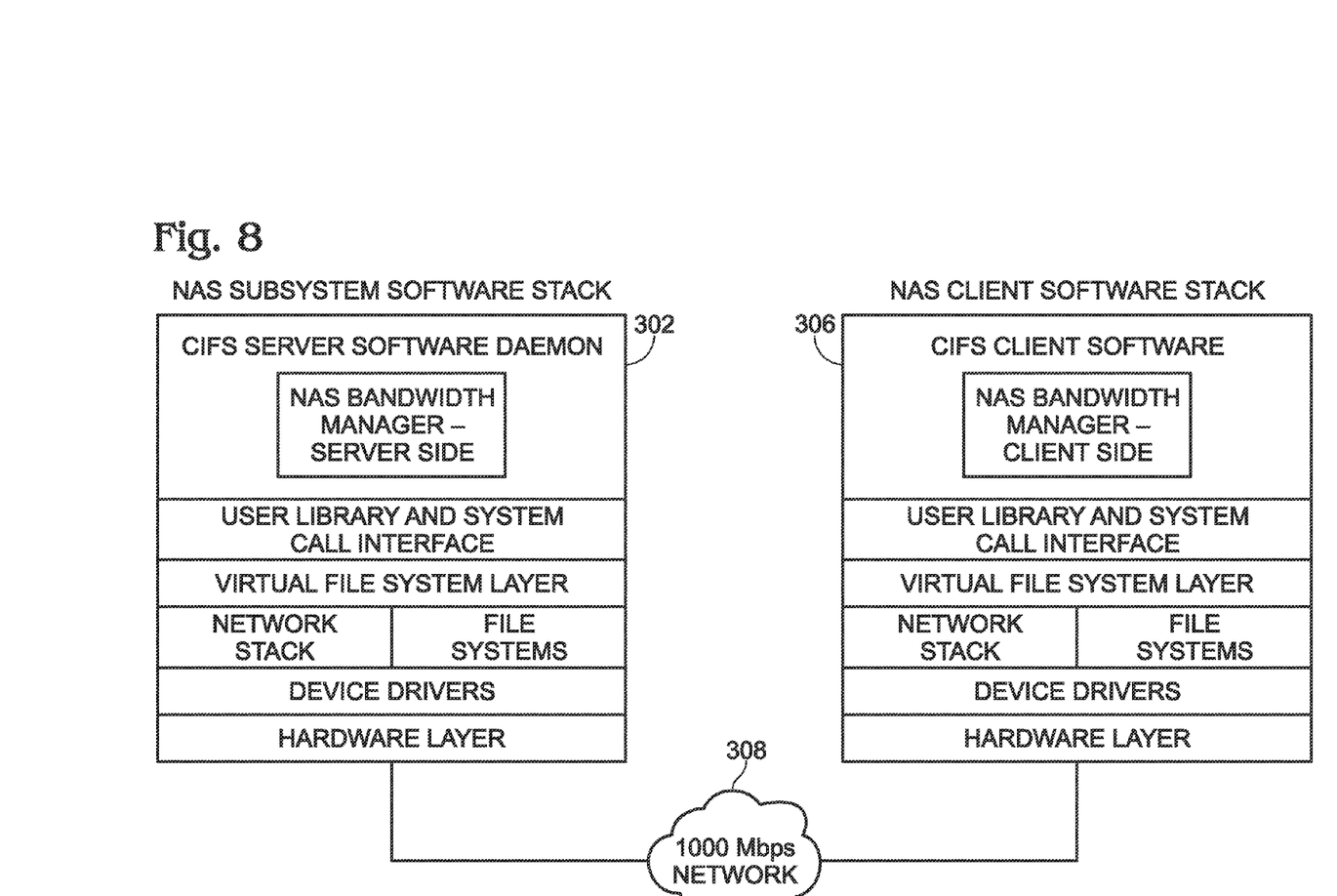
FIG. 8 is a more detailed depiction of exemplary software layers in the NAS storage device and client computing device used to support rate negotiation.

FIG. 8 is a more detailed depiction of exemplary software layers in the NAS storage device and client computing device used to support rate negotiation. The placement of the client side and server side portions of the NAS bandwidth managers are shown in their respective software stacks. The NAS bandwidth manager is a part of the CIFS server software daemon that runs on the NAS subsystem. On the client side it is a part of the CIFS client software which runs on the client computer.

Figure 9:
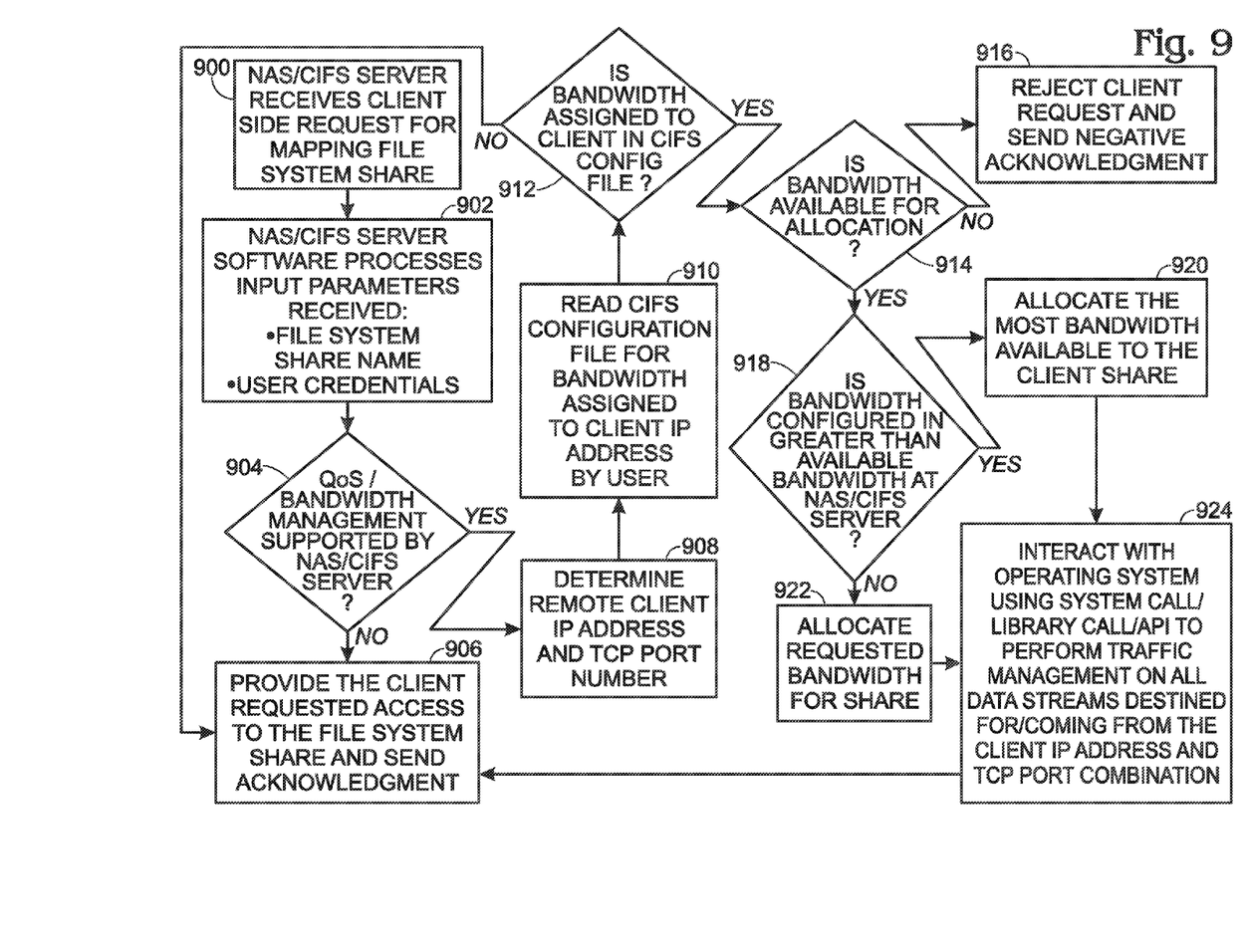
FIG. 9 is a flowchart illustrating a bandwidth management process enabled only on the NAS storage device.

FIG. 9 is a flowchart illustrating a bandwidth management process enabled only on the NAS storage device. The bandwidth management system associated with FIG. 3 requires software implementation of NAS bandwidth manager only the server side. Here, the bandwidth allocation is performed only by client identity. In this case the user can assign bandwidth to different CIFS clients by IP address, using the CIFS server configuration file or any other method that maintains this state information on the CIFS server. The format of this configuration is implementation dependent and can be as simple as the following example:

Client 1 IP address=25 MBps; and,
Client 2 IP address=20 MBps.

In Step 900 the CIFS/NAS server receives a mapping request from the client and in Step 902 it verifies the file system share name and user credentials, which are sent by the client requesting the mapping. If bandwidth management is not supported by the CIFS/NAS server (Step 904), it maps the requested file system share and returns a positive acknowledgement to the client in Step 906. If bandwidth management is supported on the NAS subsystem, the NAS bandwidth manager module determines the IP address and the TCP port number of the requesting client connection in Step 908. In Step 910 the software reads the CIFS server configuration file for the specific amount of bandwidth assigned to the client requesting the share mapping. If no bandwidth is assigned to the client in the CIFS configuration file (Step 912), the CIFS/NAS server maps the requested file system share and returns a positive acknowledgement to the client in Step 906.

If bandwidth is assigned to the client in the CIFS configuration file, the CIFS/NAS server software attempts to allocate bandwidth to the client from what is available (Step 914). The bandwidth manager maintains state information of the bandwidth allocated to various clients and file system shares mapped. If no more (zero) bandwidth is available for allocation to any client requesting access to a file system share, the NAS subsystem rejects the client mapping request and sends back a negative acknowledgement to the client in Step 916.

If bandwidth configured for the client is greater than what is actually available at the NAS subsystem (Step 918), the most available bandwidth is allocated to the client and a positive acknowledgement is sent back in Step 920. Once the total amount of available bandwidth is allocated on the NAS subsystem, requests for any more bandwidth are rejected. If bandwidth requested by the client is less than available bandwidth, the configured amount is allocated and a positive acknowledgement is sent back to the client in Step 922. In Step 924 the NAS bandwidth allocator uses system calls, interface/library calls, or APIs that interact with the kernel space software to allocate bandwidth per client connection.

Figure 10:
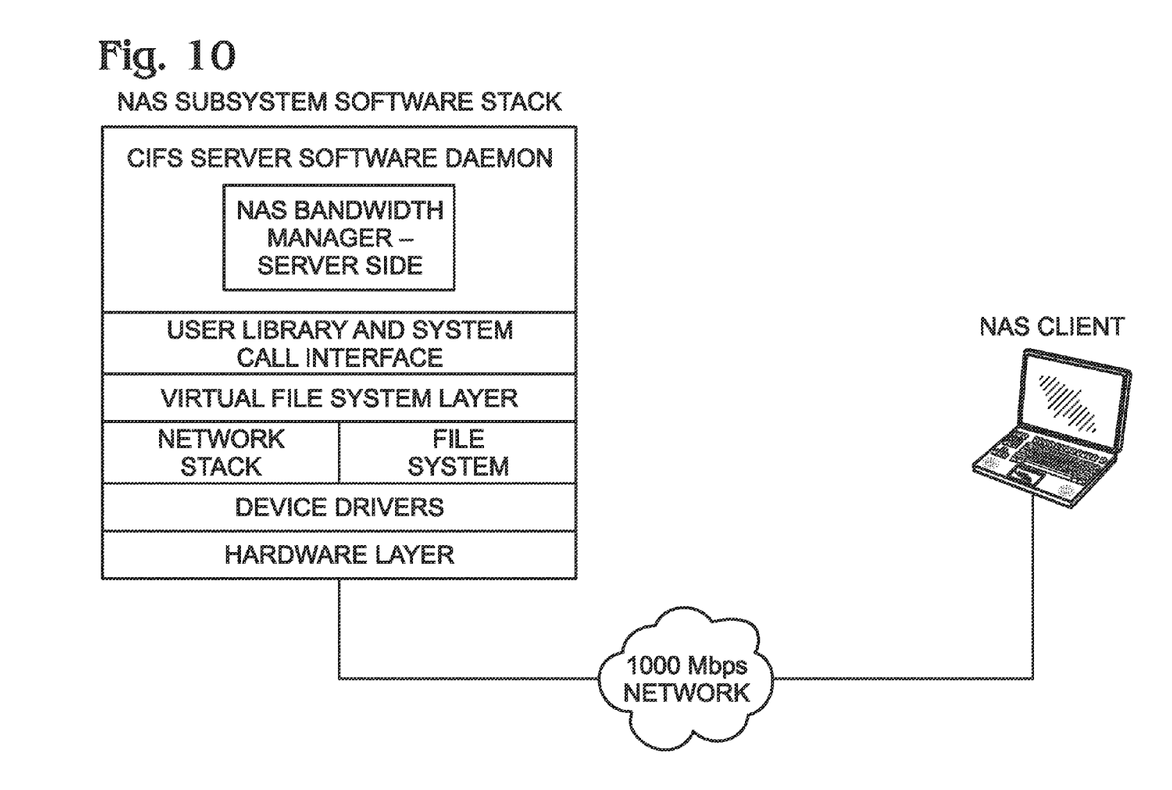
FIG. 10 is a more detailed depiction of exemplary software layers in the NAS storage device used to support the bandwidth management process of FIG. 9.

FIG. 10 is a more detailed depiction of exemplary software layers in the NAS storage device used to support the bandwidth management process of FIG. 9. Only the server-side implementation of the software module is required for enablement of the bandwidth manager. The NAS Bandwidth manager is a part of the CIFS server software daemon which runs on the NAS subsystem. In this method any client can be used to take advantage of NAS bandwidth manager feature on the NAS subsystem, without the requirement of client-side bandwidth management software.

Every OS (operating system) provides software interfaces to perform traffic management and bandwidth division operations. By using system calls/library routines or other hooks in user land software that call OS kernel services, traffic management and bandwidth management operations can be performed for a particular network interface. Traffic management or bandwidth management may be performed in the OS kernel by using source/destination IP address, TCP port number, MAC address, or any other parameters in the TCP/IP header. The specific implementation of how traffic management is performed by the OS is well known in the art. The traffic management feature is a standard service provided by most operating systems.

Figure 11A:
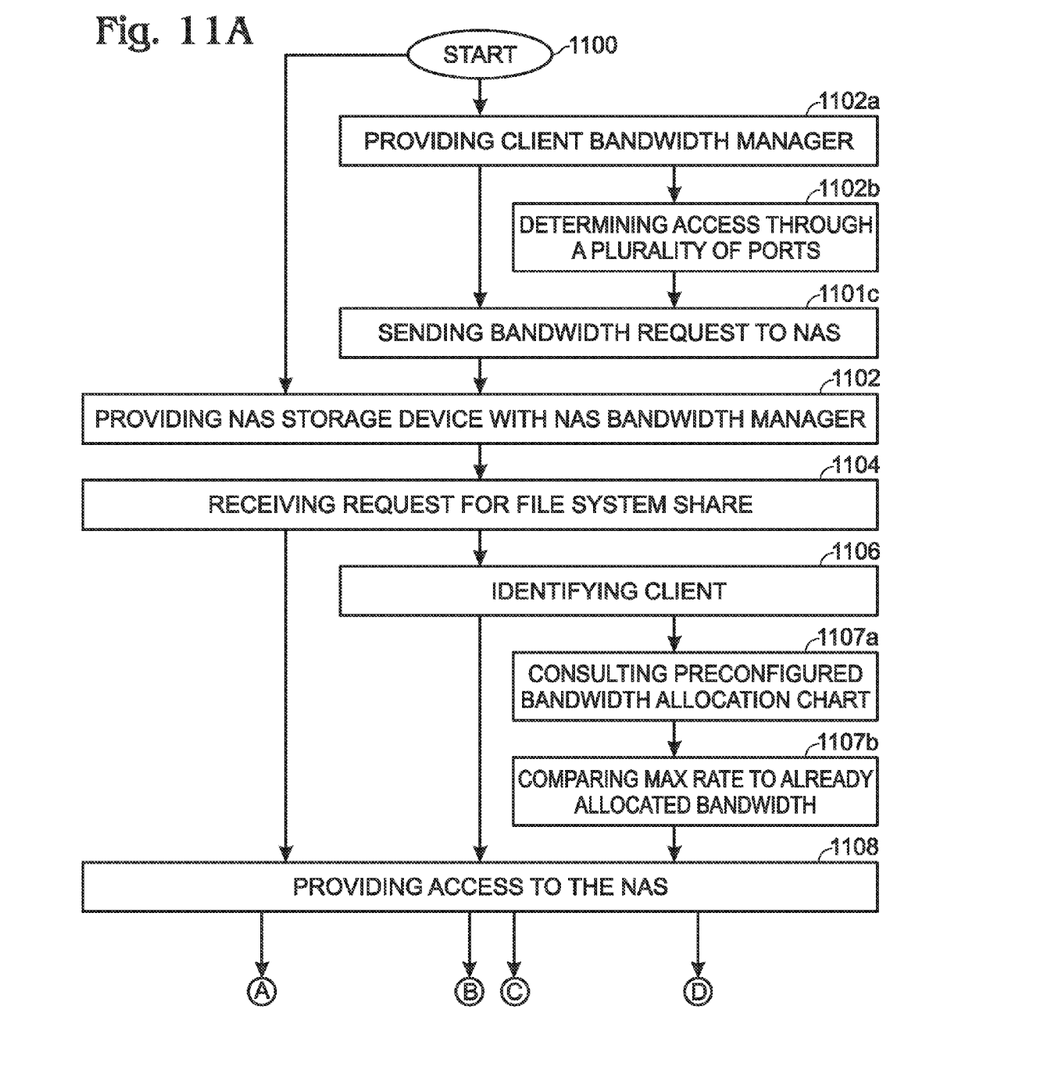
FIGS. 11A and 11B are flowcharts illustrating a process for managing bandwidth in a NAS system.
Figure 11B:
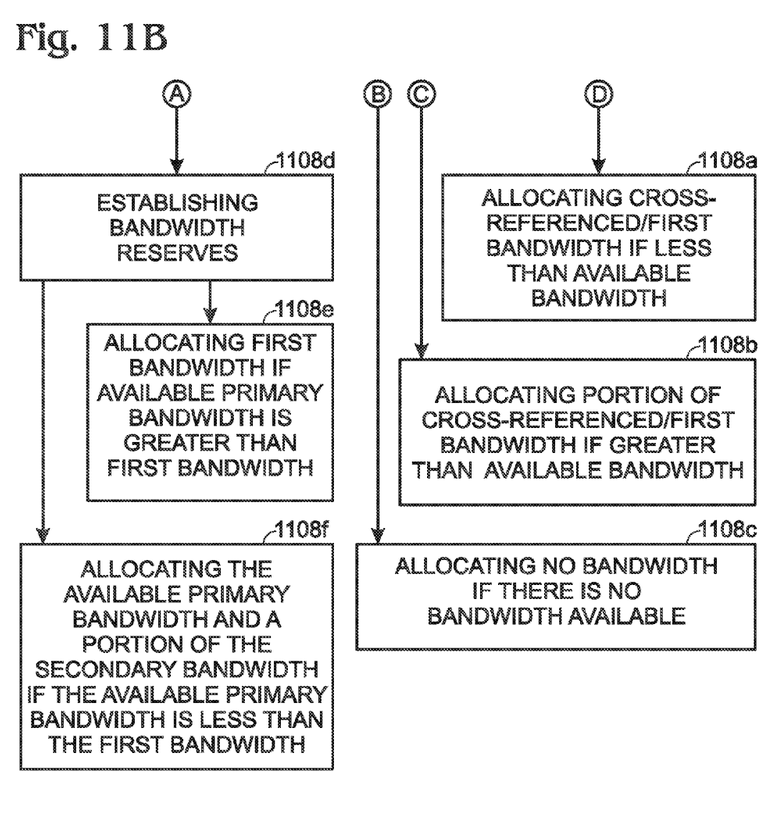

FIGS. 11A and 11B are flowcharts illustrating a process for managing bandwidth in a NAS system. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps are performed in numerical order. The method starts at Step 1100.

Step 1102 provides a NAS storage device having a network interface, at least one storage drive, a controller head, and a NAS bandwidth manager application enabled as a sequence of software instructions stored in memory and executed by a processor. Step 1104 receives a request for access to a file system share from a first client via a network having a maximum throughput rate. In Step 1106 the NAS bandwidth manager identifies the first client. In Step 1108 the NAS bandwidth manager provides first client access to the NAS at an allocated bandwidth.

In one aspect, the NAS bandwidth manager consults a preconfigured bandwidth allocation chart in Step 1107a in response to the first client request of Step 1104. The chart cross-references bandwidth allocation to client identity. Then, Step 1108 allocates the bandwidth cross-referenced (in the chart) to the first client. More explicitly, in Step 1107b the NAS bandwidth manager compares the network maximum throughput rate to already allocated bandwidth, to determine available bandwidth. Then, Step 1108 provides first client access to the NAS at the allocated bandwidth using the following substeps. Step 1108a allocates the bandwidth cross-referenced to the first client, if the cross-referenced bandwidth is less than the available bandwidth. Step 1108b allocates a portion of the bandwidth cross-referenced to the first client, if the cross-referenced bandwidth is greater than the available bandwidth. Step 1108c allocates no bandwidth to the first client if there is no available bandwidth. Note: the NAS bandwidth manager may fail to allocate bandwidth to the first client if the first client has no preconfigured bandwidth allocation value.

In another aspect, receiving the request from the first client in Step 1104 includes receiving a request for a first bandwidth from the first client. Then, in Step 1107b the NAS bandwidth manager compares the network maximum throughput rate to already allocated bandwidth, and in Step 1108 the NAS bandwidth manager allocates the first bandwidth on a per client basis, in response to determining the available bandwidth. In one variation, Step 1104 receives a bandwidth management by share request for a plurality of bandwidths corresponding to a plurality of first client network ports, and in Step 1108 the NAS bandwidth manager allocates the plurality of bandwidths to the corresponding first client network ports in response to determining the available bandwidth. Note: only a portion of the requested bandwidths may be allocated if sufficient bandwidth is not available.

In one aspect, Step 1101a provides a first client bandwidth manager application enabled as a sequence of software instructions stored in memory and executed by a processor, and in Step 1101c the first client bandwidth manager sends the request to access the NAS at the first bandwidth, on a per client basis. In one variation, the first client bandwidth manager determines in Step 1101b that it is able to access the NAS via a plurality of network ports. Then, sending the request to access the NAS in Step 1101c includes sending a bandwidth management by share request to access the NAS at a plurality of bandwidths corresponding to the plurality of network ports.

When the first client requests a particular bandwidth in Step 1104, the NAS bandwidth manager allocates bandwidth in a similar manner as described above. Step 1108a allocates the first (requested) bandwidth to the first client, if the cross-referenced bandwidth is less than the available bandwidth. Step 1108b allocates a portion of the first bandwidth to the first client, if the cross-referenced bandwidth is greater than the available bandwidth. Step 1108c allocates no bandwidth to the first client if there is no available bandwidth. Note: the NAS bandwidth manager may also fail allocate bandwidth if the first client fails to request an explicit bandwidth value.

In another aspect, providing the NAS storage device in Step 1102 includes determining available bandwidth, and providing the first client access to the NAS at the allocated bandwidth in Step 1108 includes the NAS bandwidth manager allocating bandwidth in accordance with the following substeps. Step 1108d establishes a primary bandwidth reserve and a secondary bandwidth reserve. Step 1108e allocates the first bandwidth to the first client if the available primary bandwidth is greater than, or equal to the first bandwidth. If the available primary bandwidth is less than the first bandwidth, Step 1108f allocates the available primary bandwidth and a portion of the secondary bandwidth reserve to the first client.

A system and method for NAS bandwidth management have been provided. Examples of software modules have been used to illustrate the invention. However, the invention is not limited to just these examples. Other variations and embodiments of the invention will occur to those skilled in the art.

I claim:

1. A method for managing bandwidth in a network-attached storage (NAS) system, comprising:
    receiving, at a NAS storage device via a network, a request from a client device for a plurality of bandwidths corresponding to a respective plurality of network ports associated with the client device, wherein the plurality of network ports correspond to respective connections between the client device and the NAS storage device;
    allocating, by a NAS bandwidth manager component of the NAS storage device, the plurality of bandwidths, respectively, to corresponding network ports of the plurality of network ports; and
    providing to the client device, by the NAS bandwidth manager component, access to the NAS storage device in accordance with the plurality of bandwidths.

2. The method of claim 1, further comprising:
    determining, by the NAS bandwidth manager component, an available bandwidth of the network;
    wherein the providing the access to the NAS storage device comprises:
        allocating, to a network port of the plurality of network ports, a requested bandwidth of the plurality of bandwidths in response to a determination that the requested bandwidth is less than the available bandwidth;
        allocating a portion of the requested bandwidth to the network port in response to a determination that the requested bandwidth is greater than the available bandwidth; and
        allocating no bandwidth to the network port in response to a determination that the network has no available bandwidth.

3. The method of claim 1, further comprising:
    comparing, by the NAS bandwidth manager component, a network maximum throughput rate to an amount of bandwidth that has already been allocated; and
    allocating a requested bandwidth on a per client basis based on an available bandwidth.

4. The method of claim 3, further comprising:
    receiving, from a bandwidth manager component executing on the client device, the request to access the NAS storage device at the requested bandwidth.

5. The method of claim 3, wherein the providing the access to the NAS storage device comprises:
    allocating the requested bandwidth to the client device in response to determining that the requested bandwidth is less than the available bandwidth;
    allocating a portion of the requested bandwidth to the client device in response to determining that the requested bandwidth is greater than the available bandwidth; and
    allocating no bandwidth to the client device in response to determining that the network has no available bandwidth.

6. The method of claim 1, further comprising:
    declining, by the NAS bandwidth manager component, to provide access to the NAS storage device in response to a determination that the client device has not included an explicit bandwidth value in the request.

7. The method of claim 1, further comprising:
    determining, by the NAS bandwidth manager, an available bandwidth;
    establishing a primary bandwidth reserve and a secondary bandwidth reserve;
    in response to determining that an available primary bandwidth of the primary bandwidth reserve is greater than or equal to a requested bandwidth, allocating the requested bandwidth to the client device; and
    in response to determining that the available primary bandwidth is less than the requested bandwidth, allocating the available primary bandwidth and a portion of the secondary bandwidth reserve to the client device.

8. The method of claim 2, wherein the determining the available bandwidth comprises comparing, by the NAS bandwidth manager component, a network maximum throughput rate with an amount of allocated bandwidth.

9. The method of claim 1, further comprising:
    identifying, by the NAS bandwidth manager component, the client device; and
    consulting, by the NAS bandwidth manager component, a bandwidth allocation chart that cross-references multiple bandwidth allocations to respective client device identities, wherein the allocating comprises allocating at least one of the plurality of bandwidths based on a result of the consulting.

10. A network-attached storage (NAS) storage device, comprising:
  a network interface configured to connect to a client computing device via a network;
  at least one storage drive;
  a NAS bandwidth manager component configured to receive, from the client computing device, a request for a plurality of bandwidths corresponding to a respective plurality of network ports associated with the client computing device, and allocate the plurality of bandwidths, respectively, to corresponding network ports of the plurality of network ports, wherein the plurality of network ports correspond to respective connections between the client computing device and the NAS storage device.

11. The device of claim 10, wherein the NAS bandwidth manager component is further configured to:
  compare a network maximum throughput rate to an amount of bandwidth that has already been allocated to determine an available bandwidth;
  allocate at least one bandwidth of the plurality of bandwidths to a respective at least one network port of the client computing device in response to a determination that the at least one bandwidth is less than the available bandwidth;
  allocate a portion of the at least one bandwidth to the at least one network port in response to a determination that the at least one bandwidth is greater than the available bandwidth; and
  allocate no bandwidth to the at least one network port in response to a determination that the network has no available bandwidth.

12. The device of claim 10, wherein the request is a first request, and wherein the NAS bandwidth manager component is further configured to:
  compare a network maximum throughput rate to an amount of bandwidth that has already been allocated to determine an available bandwidth, and
  allocate a requested bandwidth on a per client basis in response to receipt of a second request for the requested bandwidth.

13. The device of claim 10, wherein the NAS bandwidth manager is further configured to receive the request from a client bandwidth manager component that executes on the client computing device.

14. The device of claim 12, wherein the NAS bandwidth manager is further configured to:
  allocate the requested bandwidth to the client computing device in response to a determination that the requested bandwidth is less than the available bandwidth;
  allocate a portion of the requested bandwidth to the client computing device in response to a determination that the requested bandwidth is greater than the available bandwidth; and
  allocate no bandwidth to the client computing device in response to a determination that the network has no available bandwidth.

15. The device of claim 10, wherein the NAS bandwidth manager component is further configured to deny the client computing device access to the NAS storage device in response to a determination that the request does not specify an explicit amount of bandwidth.

16. The device of claim 10, wherein the NAS bandwidth manager component is further configured to:
  establish a primary bandwidth reserve and a secondary bandwidth reserve,
  in response to a determination that an available primary bandwidth of the primary bandwidth reserve is greater than or equal to a requested bandwidth of the plurality of bandwidths, allocate the requested bandwidth to the client computing device, and
  in response to a determination that the available primary bandwidth is less than the requested bandwidth, allocate the available primary bandwidth and a portion of the secondary bandwidth reserve to the client computing device.

17. The device of claim 10, wherein the client computing device uses different transmission control protocol (TCP) ports for the respective connections.

18. The method of claim 9, further comprising declining, by the NAS bandwidth manager component, to allocate the at least one of the plurality of bandwidths in response to a determination that the client device does not have a bandwidth allocation specified in the bandwidth allocation chart.

19. The device of claim 10, wherein the NAS bandwidth manager component is further configured to provide, to the client computing device, access to the NAS storage device in accordance with the plurality of bandwidths.

20. The device of claim 10, wherein the NAS bandwidth manager component is further configured to:
  identify the client computing device,
  determine an allocated bandwidth cross-referenced to the client computing device based on the bandwidth allocation chart, and
  provide, to the client computing device, access to the NAS storage device in accordance with the allocated bandwidth.

* * * * *